US010572291B2

(12) United States Patent
Cui et al.

(10) Patent No.: US 10,572,291 B2
(45) Date of Patent: Feb. 25, 2020

(54) VIRTUAL NETWORK MANAGEMENT
(71) Applicant: NEW H3C TECHNOLOGIES CO., LTD., Hangzhou (CN)
(72) Inventors: Kai Cui, Beijing (CN); Yan Mu, Beijing (CN)
(73) Assignee: New H3C Technologies Co., Ltd., Hangzhou (CN)
(*) Notice: Subject to any disclaimer, the term of this patent is extended or adjusted under 35 U.S.C. 154(b) by 216 days.
(21) Appl. No.: 15/744,704
(22) PCT Filed: Aug. 17, 2016
(86) PCT No.: PCT/CN2016/095687
§ 371 (c)(1),
(2) Date: Jan. 12, 2018
(87) PCT Pub. No.: WO2017/032251
PCT Pub. Date: Mar. 2, 2017
(65) Prior Publication Data
US 2018/0210750 A1 Jul. 26, 2018
(30) Foreign Application Priority Data
Aug. 25, 2015 (CN) .......................... 2015 1 0527718
(51) Int. Cl.
G06F 9/455 (2018.01)
H04L 12/24 (2006.01)
(Continued)
(52) U.S. Cl.
CPC ...... G06F 9/45558 (2013.01); H04L 41/0806 (2013.01); H04L 41/12 (2013.01);
(Continued)
(58) Field of Classification Search
None
See application file for complete search history.

(56) References Cited
U.S. PATENT DOCUMENTS
8,675,644 B2* 3/2014 Tripathi .................. H04L 49/90 370/359
8,750,164 B2* 6/2014 Casado ............... H04L 12/4633 370/254
(Continued)

FOREIGN PATENT DOCUMENTS
CN 102710432 A 10/2012
CN 103051529 A 4/2013
(Continued)

OTHER PUBLICATIONS
Tseng et al. "Network Virtualization with Cloud Virtual Switch", 2011 IEEE, pp. 998-1003.*
Pakzad et al. "Efficient Topology Discovery in Software Defined Networks", 2014 IEEE, 8 pages.*
Phan et al. "A collaborative model for routing in multi-domains OpenFlow networks", 2013 IEEE, pp. 278-283.*
(Continued)

Primary Examiner — Van H Nguyen
(74) Attorney, Agent, or Firm — McCoy Russell LLP

(57) ABSTRACT

In an example, a method for managing a virtual network is provided. According to the method, first and second domains are respectively created for heterogeneous first and second hypervisor mangers. The first hypervisor manager manages a first virtual machine (VM) and first virtual switch (vSwitch) The second hypervisor manager manages a second VM and a second vSwitch. Based on topology of the virtual network, topology management information may be created, which comprises first and second virtual network topology information respectively for the first and second domains, and first and second configuration information respectively for the first and second vSwitches. The topology management information may be distributed to the first and second hypervisor mangers after being associated with the first and second domains, so to the first and second vSwitches implement packet forwarding between the first and second VMs according to the first and second configuration information respectively.

15 Claims, 5 Drawing Sheets

(51) Int. Cl.
H04L 12/713 (2013.01)
H04L 12/931 (2013.01)

(52) U.S. Cl.
CPC ............ H04L 45/586 (2013.01); H04L 49/70 (2013.01); *G06F 2009/45595* (2013.01)

(56) References Cited

U.S. PATENT DOCUMENTS

| | | | |
|---|---|---|---|
| 9,477,506 B2 * | 10/2016 | Wang | .................... G06F 9/5088 |
| 9,912,582 B2 * | 3/2018 | Pourzandi | ............... H04L 45/42 |
| 10,079,694 B2 * | 9/2018 | Hari | .................... H04L 41/0809 |
| 2010/0257263 A1 | 10/2010 | Casado et al. | |
| 2014/0056302 A1 | 2/2014 | Benny et al. | |
| 2014/0146817 A1 | 5/2014 | Zhang | |
| 2015/0139238 A1 | 5/2015 | Pourzandi et al. | |
| 2015/0188773 A1 | 7/2015 | DeCusatis et al. | |
| 2015/0195178 A1 | 7/2015 | Bhattacharya et al. | |
| 2015/0212844 A1 | 7/2015 | Tsirkin et al. | |
| 2016/0119256 A1 * | 4/2016 | Wang | .................. H04L 12/6418 370/401 |

FOREIGN PATENT DOCUMENTS

| | | |
|---|---|---|
| CN | 103516802 A | 1/2014 |
| CN | 104115453 A | 10/2014 |
| CN | 104303467 A | 1/2015 |
| CN | 104518935 A | 4/2015 |
| JP | 2012525017 A | 10/2012 |
| JP | 2014182576 A | 9/2014 |
| WO | 2015092568 A1 | 6/2015 |

OTHER PUBLICATIONS

Anhalt et al. "A Virtual Switch Architecture for Hosting Virtual Networks on the Internet", 2010 IEEE, pp. 26-31.*

Phemius et al. "Disco : Distributed SDN Controllers in a Multi-domain Environment", 2014 IEEE, 2 pages.*

State Intellectual Property Office of the People's Republic of China, Office Action and Search Report Issued in Application No. 201510527718.0, dated Apr. 12, 2019, 9 pages. (Submitted with Partial Translation).

ISA State Intellectual Property Office of the People's Republic of China, International Search Report Issued in Application No. PCT/CN2016/095687, dated Nov. 9, 2016, WIPO. 4 pages.

"Developing and providing carrier-grade DC platform of multi-DCs support based on OpenStack and SDN technology," Buisness Communication, vol. 52, No. 3, Mar. 3, 2015, 9 pages.

ISA State Intellectual Property Office of the People's Republic of China, Written Opinion of the International Searching Authority Issued in Application No. PCT/CN2016/095687, dated Nov. 9, 2016, WIPO, 6 pages.

European Patent Office, Office Action Issued in Application No. 16838510.2, dated Feb. 5, 2019, Germany, 7 pages.

Japanese Patent Office, Office Action Issued in Application No. 2018-510364, dated Mar. 5, 2019, 7 pages. (Submitted with Machine Translation).

European Patent Office, Extended European Search Report Issued in Application No. 16838510.2, Mar. 29, 2018, Germany, 10 pages.

European Patent Office, Office Action Issued in Application No. 16838510.2, dated Sep. 26, 2019, Germany, 7 pages.

* cited by examiner

VIRTUAL NETWORK MANAGEMENT

CROSS-REFERENCE TO RELATED APPLICATIONS

The present application is a U.S. National Phase of International Patent Application Serial No. PCT/CN2016/095687 entitled "VIRTUAL NETWORK MANAGEMENT," filed on Aug. 17, 2016. International Patent Application Serial No. PCT/CN2016/095687 claims priority to Chinese Patent Application No. 201510527718.0, filed on Aug. 25, 2015. The entire contents of each of the above-cited applications are hereby incorporated by reference in their entirety for all purposes.

BACKGROUND

In network virtualization technologies of a data center, multiple heterogeneous hypervisors may be utilized to coordinate in accessing different physical devices and virtual machines (VMs). Virtual switches (vSwitches) configured in hypervisors may provide communication capability among VMs and between VMs and external networks. These hypervisors and vSwitches may be managed by different hypervisor managers. Since vSwitches managed by different hypervisor managers may go online in in different ways, different hypervisor managers may be controlled by different Soft Defined Network (SDN) controllers or an SDN controller cluster. However, different SDN controllers cannot sense each other's overlay networks. Therefore, direct communication may likely be unavailable for VMs running on the heterogeneous hypervisors via overlay networks.

DETAILED DESCRIPTION OF THE EMBODIMENTS

Figure 1:
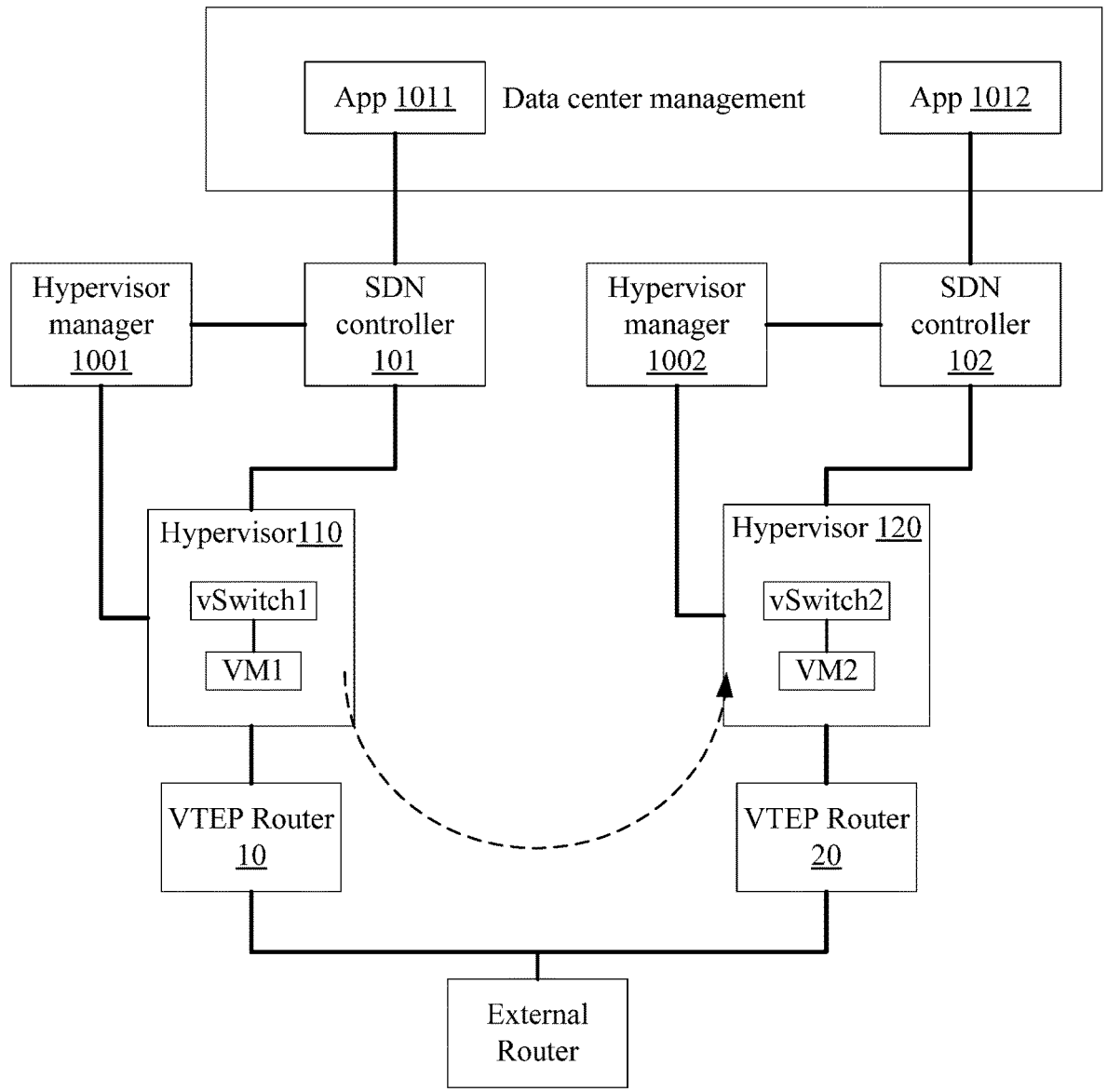
FIG. 1 is a schematic diagram of networking architecture for managing a virtual network.

Referring to FIG. 1, it is a schematic diagram of a commonly-used networking architecture for managing a virtual network. As shown in FIG. 1, in data center management, multiple hypervisors with different structures may be utilized to manage and control VMs to provide various services such as a computing service for a user. Heterogeneous hypervisors may be managed by different hypervisor managers, for example, a hypervisor 110 may be managed by a hypervisor manager 1001 and a hypervisor 120 may be managed by a hypervisor manager 1002. A forwarding engine providing relevant network services generally may be installed in the hypervisors 110 and 120, and the forwarding engine may be referred to as virtual Switch (vSwitch). Since vSwitches in different hypervisors may go online in different ways, in the data center management, different SDN controllers may likely be required for managing heterogeneous hypervisors. VMs in each hypervisor generally may interact with one another by means of a vSwitch corresponding to the hypervisor, and each vSwitch may be connected to multiple VMs.

However, when a VM1 subordinate to a vSwitch 1 sends a packet to a VM2 subordinate to a vSwitch 2, direct communication may likely be unavailable for the VM1 and the VM2 via overlay networks. This is because the hypervisor 110 and the hypervisor 120 are managed by different SDN controllers 101 and 102, and different SDN controllers cannot sense each other's overlay networks. One of solutions may be to perform packet forwarding by using a traditional network, wherein, the packet forwarding path may be VM1→vSwitch1→VTEP Router 10→VTEP Router 20→vSwitch2→VM2, just as shown by a dotted arrow in FIG. 1. The VTEP Routers 10 and 20 may be used as gateways. The packet forwarding path may be configured in the SDN controllers 101 and 102 respectively. The foregoing mode for forwarding a packet is relatively complex, which may lead to a lower efficiency in packet forwarding. In addition, different SDN controllers may be managed by different applications (APPs), for example, the SDN controller 101 may be managed by an APP 1011 and the SDN controller 102 may be managed by an APP 1012, which may cause much difficulty in data center management.

To solve the foregoing problem, in this disclosure, a method and apparatus for managing a virtual network are provided. Therein, different domains may be created for managers for managing heterogeneous hypervisors, and virtual network topologies of multiple domains may be managed by topology management information. Thus, an SDN controller may achieve unified control of heterogeneous hypervisor managers and VMs in the heterogeneous hypervisors may communicate with each other via an overlay network. In this way, a packet forwarding process may be simplified, a forwarding efficiency may be improved and a management difficulty may be reduced.

Herein, heterogeneous Hypervisors refer to Hypervisors provided by different vendors, which realize virtualization of a server by using different ways. For example, typical KVM Hypervisors and vCenter Hypervisors may use different virtualization technologies, and provide different user interfaces and operation procedures, either. A Hypervisor manager may manage a certain type of Hypervisors. And heterogeneous Hypervisor managers from different vendors may provide different operation modes of virtualization. The domain may manage entities of various types of hypervisor managers. The entities may deploy, in the same way, topology information parameters in vSwitches managed by various types of hypervisor managers, so that heterogeneous hypervisors may be managed collectively.

Figure 2:
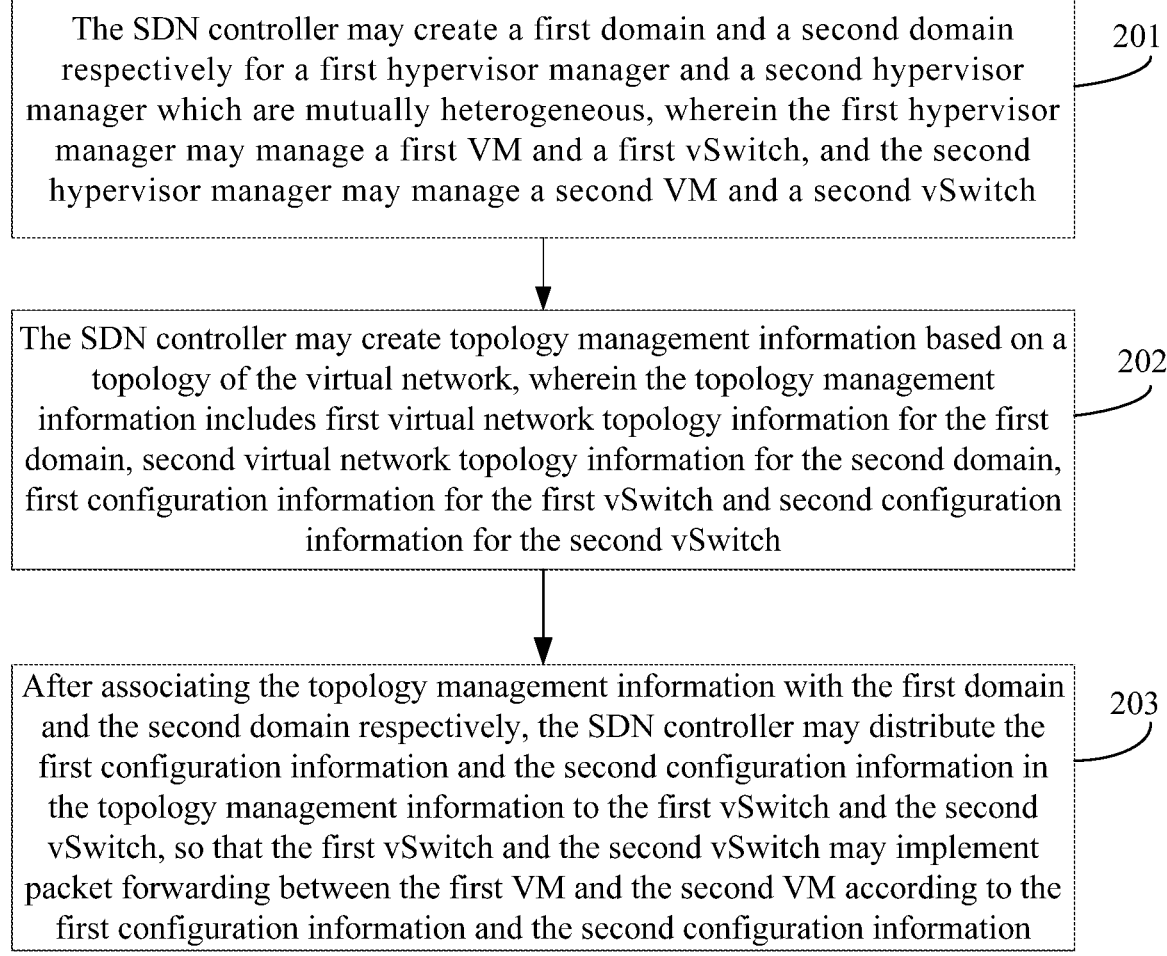
FIG. 2 is a flowchart of a method for managing a virtual network according to an example of this disclosure.

Referring to FIG. 2, it is a processing flowchart of a method for managing a virtual network according to an example of this disclosure, wherein the method may be applied to an SDN controller in a virtual network and may include blocks 201-203.

At block 201, the SDN controller may create a first domain and a second domain respectively for a first hypervisor manager and a second hypervisor manager. The first hypervisor manager and the second hypervisor manager may be mutually heterogeneous, the first hypervisor manager may manage a first virtual machine (VM) and a first virtual switch (vSwitch), and the second hypervisor manager may manage a second VM and a second vSwitch.

In an example, when the virtual network is built, the SDN controller may control different hypervisor managers by different domains, namely, the SDN controller may create the first domain and the second domain respectively for the first hypervisor manager and the second hypervisor manager.

At block 202, the SDN controller may create topology management information based on a topology of the virtual network, wherein the topology management information includes first virtual network topology information, second virtual network topology information, first configuration information and second configuration information.

In this example, the SDN controller may further create topology management information according to a pre-configured virtual network topology. The topology management information may include virtual network topologies of the first domain and the second domain participating in packet forwarding. For example, the virtual network topology of the first domain may be referred to as first virtual network topology information, including a virtual IP address and a going-online port or the like corresponding to the first VM. The virtual network topology of the second domain may be referred to as second virtual network topology information, including a virtual IP address and a going-online port or the like corresponding to the second VM. In addition, the topology management information may further include different vSwitch configuration information preset for heterogeneous hypervisors. For example, the configuration information set for a vSwitch managed by the first hypervisor manager may be referred to as first configuration information, including a name, a forwarding mode, a virtual MAC address and VXLAN of the first vSwitch, or the like. And the configuration information set for a vSwitch managed by the second hypervisor manager may be referred to as second configuration information, including a name, a forwarding mode, a virtual MAC address and VXLAN of the second vSwitch, etc. In an example, creating the topology management information may also be implemented by means of a virtual distributed switch (VDS).

At block 203, after associating the topology management information with the first domain and the second domain respectively, the first configuration information and the second configuration information in the topology management information may be distributed to the first vSwitch and the second vSwitch respectively. Thus the first vSwitch and the second vSwitch may perform packet forwarding between the first VM and the second VM according to the first configuration information and the second configuration information respectively.

In this example, the SDN controller may associate the topology management information with the first domain and the second domain respectively, and then distribute the first configuration information and the second configuration information in the topology management information respectively to the first vSwitch managed by the first hypervisor manager in the first domain and the second vSwitch managed by the second hypervisor manager in the second domain. The first vSwitch may guide packet forwarding on the first VM according to the first configuration information. The second vSwitch may guide packet forwarding on the second VM according to the second configuration information.

In another example, after associating the topology management information with the first domain and the second domain respectively, the SDN controller may distribute the topology management information to the first hypervisor manager and the second hypervisor manager. Then the first hypervisor manager may distribute the first configuration information in the received topology management information to the first vSwitch managed by the first hypervisor manager, and the second hypervisor manager may distribute the second configuration information in the received topology management information to the second vSwitch managed by the second hypervisor manager. The first vSwitch and the second vSwitch may perform packet forwarding between the first VM and the second VM according to the first configuration information and the second configuration information.

Therefore, the SDN controller may control the first vSwitch and the second vSwitch according to the topology management information so that the first VM and the second VM in the heterogeneous hypervisors may communicate with each other by means of the first vSwitch and the second vSwitch.

As can be seen from the above, different domains may be created for heterogeneous hypervisor managers, and virtual network topologies of multiple domains may be recorded by topology management information. Thus, an SDN controller may achieve unified control of the heterogeneous hypervisor managers and allow VMs running in heterogeneous hypervisors to communicate with each other via an overlay network, thereby simplifying a forwarding process, improving a forwarding efficiency and facilitating management.

After the virtual network is built, when a vSwitch or VM goes online, the SDN controller may timely acquire information of the newly-online virtual network device according to information fed back from the vSwitch.

Specifically, when a third vSwitch goes online in the first hypervisor manager, the SDN controller may receive an openflow connection request and a vSwitch-online message, for example, an openflow message indicating to increase switches, which are sent by the third vSwitch. Afterward, the SDN controller may create a record for the third vSwitch in the first domain corresponding to the first hypervisor manager according to the vSwitch-online message. When a third VM goes online in the first hypervisor manager, the SDN controller may receive a VM-online message sent by a vSwitch corresponding to the third VM, for example, an openflow message of portstatus. The SDN controller may add a record for the third VM into the topology management information according to the VM-online message, wherein the record may include information such as an virtual IP address and a going-online port of the third VM, etc. Therefore, the SDN controller may utilize different domains to manage the heterogeneous hypervisor managers and implement management of virtual network devices through a virtual network topology. In this way, the SDN controller may be more efficient in management of heterogeneous hypervisors.

In an example, when the first VM sends a packet to the second VM, the packet may be first sent to the first vSwitch, and then the first vSwitch may send the packet to the SDN controller. After receiving the packet, the SDN controller may parse a source address and a target address of the packet, and determine a source virtual device of the packet to be the first VM and a target virtual device to be the second VM.

The SDN controller may determine whether the first VM and the second VM are allowed to intercommunicate according to the virtual network topology information. Since the SDN controller may implement unified management of the first hypervisor manager and the hypervisor manager which are heterogeneous, when the first VM managed by the first hypervisor manager and the second VM managed by the second hypervisor manager are configured in the same overlay network, intercommunication between the first VM and the second VM may be allowed.

In an example, the topology management information generally may include information of multiple virtual routers (vRouters), wherein each vRouter may correspond to multiple subnets, and each subnet may include multiple VMs. Since intercommunication is unavailable for different vRouters, when processing a packet, the SDN controller may need to determine whether a source virtual device and a target virtual device of the packet can intercommunicate. Specifically, the SDN controller may determine whether the first VM and the second VM correspond to the same vRouter by looking up the topology management information. When the first VM and the second VM correspond to the same vRouter, it may be determined that the first VM and the second VM are allowed to intercommunicate. Otherwise, intercommunication is unavailable.

When determining that the first VM and the second VM are allowed to intercommunicate, the SDN controller may further acquire a virtual IP address and a going-online port corresponding to the second VM from the locally managed virtual network topology information, wherein, the second VM become online in the second vSwitch through the going-online port. And the SDN controller may acquire tunnel encapsulation information of the second vSwitch corresponding to the second VM in the second domain. Afterward, the SDN controller may create a first flow table including the virtual IP address and the going-online port of the second VM and the tunnel encapsulation information of the second vSwitch. The SDN controller may distribute the first flow table to the first vSwitch, and the first vSwitch may encapsulate the packet according to the first flow table and forward the encapsulated packet to the second vSwitch via an overlay network. After receiving the encapsulated packet, the second vSwitch may decapsulate the received packet and then forward it to the SDN controller. The SDN controller may acquire, from the locally managed virtual network topology information, a corresponding going-online port through which the second VM goes online in the second vSwitch. Then the SDN controller may create a second flow table according to the going-online port and the virtual IP address of the second VM, and distribute the second flow table to the second vSwitch so that the second vSwitch may forward the packet to the second VM according to the second flow table.

Compared to a case that the packet forwarding path relies on an external network, in this disclosure, forwarding process across vSwitches may be simplified through unified management of heterogeneous hypervisors, thereby improving the forwarding efficiency.

To make the objective, technical solution and advantages of this disclosure more clear, hereinafter, the technical solution in this disclosure is further elaborated based on the architecture diagram of the virtual network in FIG. 3.

Suppose the configured virtual network includes a kernel-based virtual machine (KVM) hypervisor manager 31, a virtual center (vCenter) hypervisor manager 32 and a cloud automation system (CAS) hypervisor manager 33. The KVM hypervisor manager 31 may manage a vSwitch 1, a KVM hypervisor 310 corresponding to the vSwitch 1, a vSwitch 2 and a KVM hypervisor 320 corresponding to the vSwitch 2. The vCenter hypervisor manager 32 may manage a vSwitch 3, an ESXi hypervisor 330 corresponding to the vSwitch 3, a vSwitch 4 and an ESXi hypervisor 340 corresponding to the vSwitch 4. The CAS hypervisor manager 33 may manage a vSwitch 5, a CAS hypervisor 350 corresponding to the vSwitch 5, a vSwitch 6 and a CAS hypervisor 360 corresponding to the vSwitch 6. There may be n VMs running in each hypervisor.

In this example, a data center management platform 300 may manage an SDN controller 3000 by means of an APP, and the SDN controller 3000 may implement a unified domain management and virtual network topology management of the foregoing virtual network devices. The so-called domain management means that the SDN controller may create different domains for different types of hypervisor managers, for example, a KVM-type Domain 1 corresponding to the KVM hypervisor manager 31, a vCenter-type Domain 2 corresponding to the vCenter hypervisor manager 32, and a CAS-type Domain 3 corresponding to the CAS hypervisor manager 33. Each domain may manage a virtual network device managed by a corresponding hypervisor manager, and record tunnel encapsulation information of each vSwitch, for example, a tunnel type and a virtual IP address, etc. The SDN controller may also create topology management information, which may include n management architectures of vRouter-network-subnet-VM. Each subnet may include multiple VMs, multiple subnets may constitute a set of subnets, namely a network, a vRouter may be virtually connected with multiple subnets, and VMs corresponding to the same vRouter may be allowed to intercommunicate. A virtual IP address and a going-online port of each VM may be recorded in the topology management information. Afterward, the SDN controller may associate the topology management information with all domains participating in virtual switching, and distribute relevant configuration parameters in the topology management information to a hypervisor manager corresponding to each domain.

Figure 3:
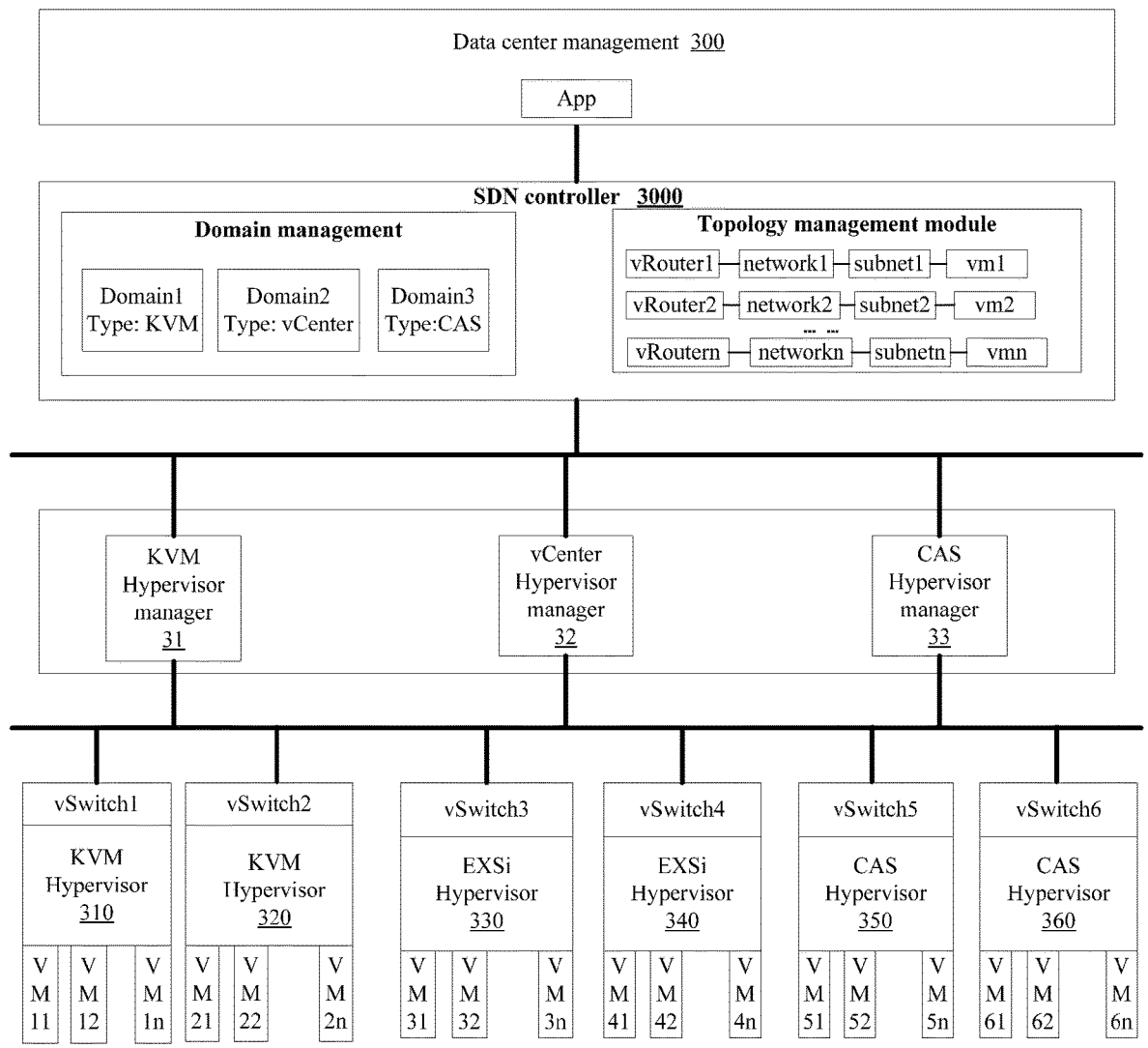
FIG. 3 is a schematic diagram of an architecture of a virtual network according to an example of this disclosure.
Figure 4:
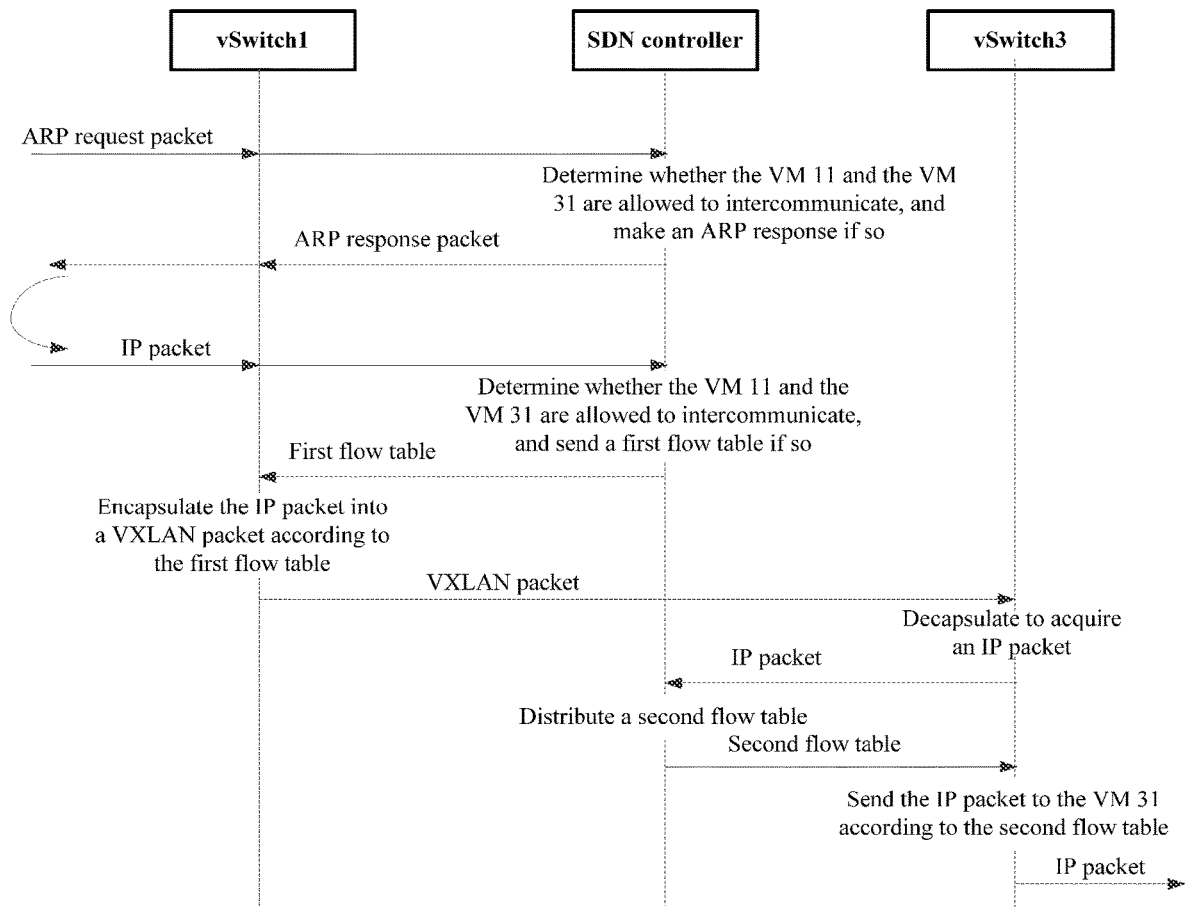
FIG. 4 is a schematic diagram of an interactive process of a virtual switch and an SDN controller according to an example of this disclosure.

As shown in FIG. 3, when a VM 11 running on the KVM hypervisor 31 sends a packet to a VM 31 running on the vCenter hypervisor 32, according to the method for managing a virtual network provided by this disclosure, an interactive process of the vSwitch 1, the vSwitch 3 and the SDN controller 3000 may be as shown in FIG. 4.

The VM 11 may send an address resolution protocol (ARP) request packet to the vSwitch 1 on the KVM hypervisor 31, wherein the ARP request packet may include a virtual IP address of the VM 11 and a virtual IP address of the VM 31.

When receiving the ARP request packet, the vSwitch 1 may send the ARP request packet to the SDN controller 3000 according to an openflow protocol.

When receiving the ARP request packet, the SDN controller 3000 may determine, according to the virtual IP addresses of the VM 11 and the VM 31, vRouters respectively corresponding to the VM 11 and the VM 31, and determine whether the VM 11 and the VM 31 are allowed to intercommunicate. It is regarded that the VM 11 and the VM 31 may be allowed to intercommunicate when the VM 31 and the VM 11 correspond to the same vRouter. A MAC address of VM 31 or the gateway corresponding to VM 31 may be used as a response to the received ARP request packet. In this example, the MAC address of the VM 31 may be used as a response to the received ARP request packet, and an ARP response packet carrying the MAC address may be distributed to the vSwitch 1.

When receiving the ARP response packet, the vSwitch 1 may forward the ARP response packet to the VM 11.

The VM 11 may acquire the MAC address of the VM 31 in the ARP response packet and create an IP packet. And wherein, a source IP address, destination IP address, source MAC address, and destination MAC address of the IP packet may be the virtual IP address of the VM 11, the virtual IP address of the VM 31, the MAC address of the VM 11, and the MAC address of the VM 31, respectively. Afterward, the VM 11 may send the created IP packet to the vSwitch 1.

When receiving the IP packet, the vSwitch 1 may send the IP packet to the SDN controller 3000 according to the openflow protocol.

When receiving the IP packet, the SDN controller 3000 may determine, according to the virtual IP addresses of the VM 11 and the VM 31, vRouters respectively corresponding to the VM 11 and the VM 31, and determine whether the VM 11 and the VM 31 are allowed to intercommunicate. It is regarded that the VM 11 and the VM 31 may intercommunicate when the VM 31 and the VM 11 correspond to the same vRouter, and thus a first flow table may be distributed to the vSwitch 1. The first flow table may include: a source IP address being the virtual IP address of the VM 11, a destination IP address being the virtual IP address of the VM 31, a source MAC address being the MAC address of the VM 11, a destination MAC address being the MAC address of the VM 31, and tunnel encapsulation information. The tunnel encapsulation information may include an encapsulation type of VXLAN, and the virtual IP address of the vSwitch1 and the virtual IP address of the vSwitch3.

When receiving the first flow table, the vSwitch 1 may perform a VXLAN encapsulation on the IP packet according to the first flow table and then send the encapsulated IP packet to the vSwitch 3.

When receiving a VXLAN packet sent by the vSwitch 1, the vSwitch 3 may perform a VXLAN decapsulation on the VXLAN packet to acquire an IP packet therein, and then send the IP packet to the SDN controller 3000.

The SDN controller 3000 may search, according to the destination IP address in the IP packet, for a going-online port of the vSwitch 3 corresponding to the VM 31, and distribute a second flow table to the vSwitch 3. The second flow table may include: a source IP address being the virtual IP address of the VM 11, a destination IP address being the virtual IP address of the VM 31, a source MAC address being the MAC address of the VM 11, a destination MAC address being the MAC address of the VM 31, and the going-online port corresponding to the VM 31.

When receiving the second flow table sent by the SDN controller 3000, the vSwitch 3 may forward the IP packet to the VM 31 according to the second flow table, thereby implementing a mutual access between the VM 11 and the VM 31.

As can be seen from the above, in this disclosure, VMs in the heterogeneous hypervisors may implement intercommunication via an overlay network through a unified management of the heterogeneous hypervisors, thereby simplifying a forwarding process, improving a forwarding efficiency and facilitating management.

Based on a basically identical conception, this disclosure further provides an apparatus for managing a virtual network, wherein the apparatus may be implemented by means of software, or may be implemented by means of hardware or combination of software and hardware. Taking software implementation as an example, the apparatus for managing a virtual network of this disclosure may be an apparatus in a logical sense, which may be achieved by a CPU on the SDN controller reading out and executing corresponding machine readable instructions in a storage medium.

Figure 5:
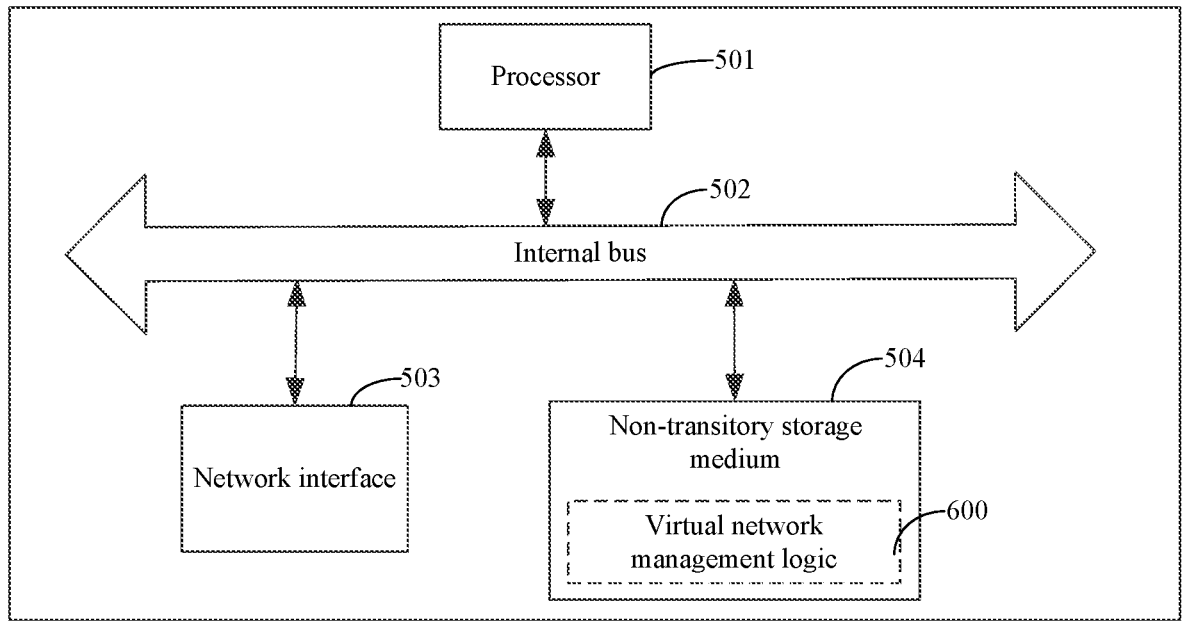
FIG. 5 is a schematic diagram of a hardware structure of an apparatus for managing a virtual network according to an example of this disclosure.

Referring to FIG. 5, it is a schematic block diagram of a hardware structure of an apparatus for managing a virtual network according to an example of this disclosure. The apparatus for managing a virtual network may be an SDN controller in the virtual network. As shown in FIG. 5, the apparatus for managing a virtual network may include: a processor 501 such as a central processing unit (CPU), an internal bus 502, a network interface 503 and a non-transitory storage medium 504. The processor 501, the network interface 503 and the non-transitory storage medium 504 may intercommunicate through the internal bus 502. The non-transitory storage medium 504 may store machine-executable instructions corresponding to a virtual network management logic 600. Functions of various modules in the apparatus for managing a virtual network may be implemented by reading and executing, by the processor 501, the machine-executable instructions corresponding to the virtual network management logic 600 stored in the non-transitory storage medium 504.

Figure 6:
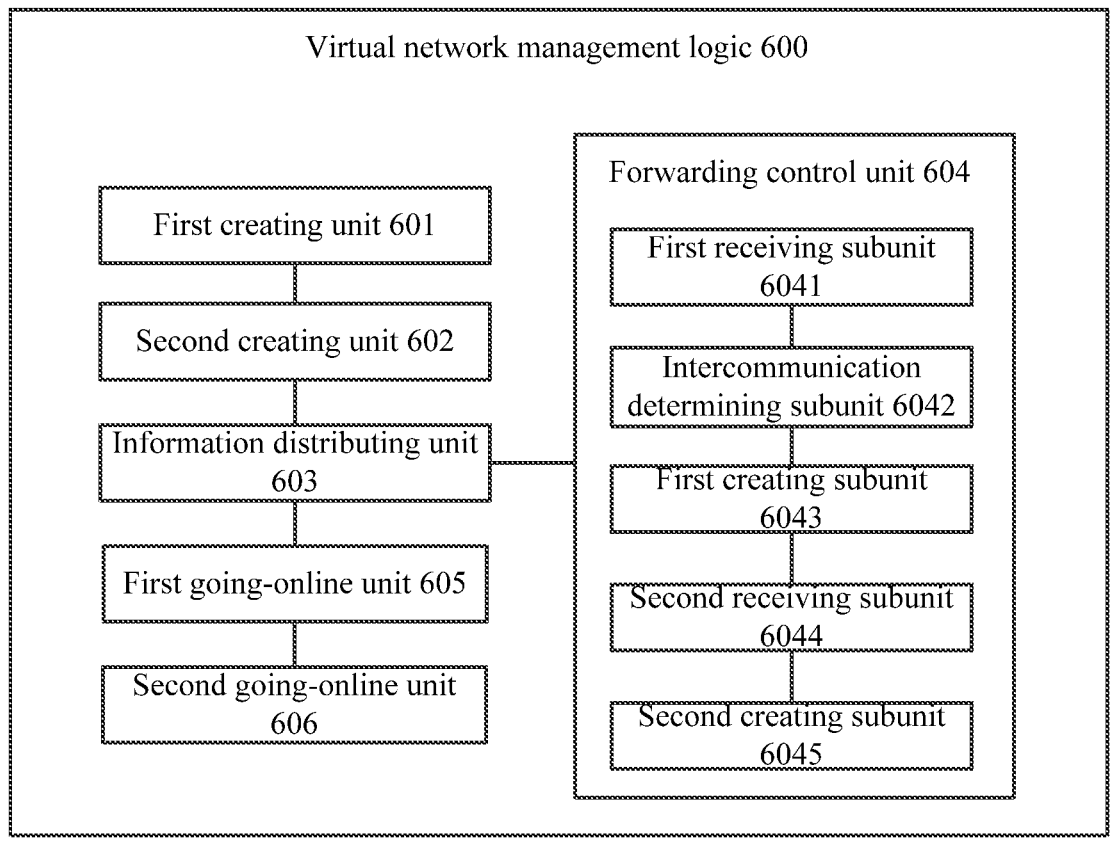
FIG. 6 is a block diagram showing functional modules of a virtual network management logic according to an example of this disclosure.

FIG. 6 illustrates a block diagram of various functional modules of a virtual network management logic. As shown in FIG. 6, divided functionally, the virtual network management logic 600 may include a first creating unit 601, a second creating unit 602, an information distributing unit 603, a forwarding control unit 604, a first going-online unit 605 and a second going-online unit 606.

The first creating unit 601 may create a first domain and a second domain respectively for a first hypervisor manager and a second hypervisor manager in the virtual network. The first hypervisor manager and the second hypervisor manager are mutually heterogeneous, the first hypervisor manager may manage a first VM and a first vSwitch, and the second hypervisor manager may manage a second VM and a second vSwitch.

The second creating unit 602 may create topology management information based on a topology of the virtual network, wherein the topology management information includes first virtual network topology information for the first domain, second virtual network topology information for the second domain, first configuration information for the first vSwitch and second configuration information for the second vSwitch.

The information distributing unit 603 may associate the topology management information with the first domain and the second domain respectively. Then the information distributing unit 603 may distribute the first configuration information and the second configuration information in the topology management information to the first vSwitch and the second vSwitch respectively. Thus, the first vSwitch and the second vSwitch may forward a packet between the first VM and the second VM according to the first configuration information and the second configuration information respectively.

In an example, the apparatus 600 may further include a first going-online unit 605. The first going-online unit 605 may receive a vSwitch-going-online message sent by a third vSwitch which is becoming online in the first hypervisor manager, and create a record for the third vSwitch in the first domain corresponding to the first hypervisor manager according to the vSwitch-going-online message.

In an example, the apparatus 600 may further include a second going-online unit 606. The second going-online unit 606 may receive a VM-going-online message sent by a vSwitch corresponding to a third VM which is becoming online in the first hypervisor manager, and add a record for the third VM into the topology management information according to the VM-going-online message.

In an example, the apparatus 600 may further include a forwarding control unit 604 which may include:

a first receiving subunit 6041 to receive a packet sent by the first vSwitch, wherein, a source virtual device of the packet is the first VM and a target virtual device of the packet is the second VM;

an intercommunication determining subunit 6042 to determine whether the first VM and the second VM are allowed to intercommunicate according to the first virtual network topology information and the second virtual network topology information;

a first creating subunit 6043 to create and distribute a first flow table to the first vSwitch when the first VM and the second VM are allowed to intercommunicate so that the first vSwitch may send the packet to the second vSwitch;

a second receiving subunit 6044 to receive the packet sent by the second vSwitch; and a second creating subunit 6045 to create a second flow table according to the packet received by the second receiving subunit 6044, and send the second flow table to the second vSwitch so that the second vSwitch may send the packet to the second VM according to the second flow table.

In an example, the intercommunication determining subunit 6042 may determine whether the first VM and the second VM correspond to the same vRouter or not by looking up the first virtual network topology information and the second virtual network topology information. It is determined that the first VM and the second VM may be allowed to intercommunicate when the first VM and the second VM correspond to the same virtual router.

In an example, the first creating subunit 6043 may acquire a virtual IP address and a going-online port corresponding to the second VM from the second virtual network topology information, wherein the second VM becomes online through the going-online port. Then the first creating subunit 6043 may acquire tunnel encapsulation information of the second vSwitch corresponding to the second VM from the second configuration information. And the first creating subunit 6043 may create the first flow table including the virtual IP address and the going-online port of the second VM and the tunnel encapsulation information.

In another example, the second creating subunit 6045 may create the second flow table including the virtual IP address and the going-online port of the second VM.

As can be seen from the above, in this disclosure, different domains may be created for heterogeneous hypervisor managers, and virtual network topologies of multiple domains may be managed by topology management information. Thus, an SDN controller may implement unified management of the heterogeneous hypervisor managers and VMs in the heterogeneous hypervisors may communicate with each other via an overlay network, thereby simplifying a forwarding process, improving a forwarding efficiency and facilitating management.

The examples set forth above are only illustrated as preferred examples of this disclosure, and are not intended to limit this disclosure. All modifications, equivalent substitutions and improvements made within the spirit and principles of this disclosure shall fall within the protection scope of this disclosure.

The invention claimed is:

1. A method for managing a virtual network, comprising:
    creating, by a Software Defined Network (SDN) controller, a first domain and a second domain respectively for a first hypervisor manager and a second hypervisor manager in a virtual network, wherein the first hypervisor manager and the second hypervisor manager are heterogeneous, the first hypervisor manager manages a first virtual machine (VM) and a first virtual switch (vSwitch), and the second hypervisor manager manages a second VM and a second vSwitch;
    creating, by the SDN controller, topology management information based on a topology of the virtual network, wherein the topology management information comprises first virtual network topology information for the first domain, second virtual network topology information for the second domain, first configuration information for the first vSwitch and second configuration information for the second vSwitch;
    associating, by the SDN controller, the topology management information with the first domain and the second domain respectively; and
    distributing, by the SDN controller, the first configuration information and the second configuration information in the topology management information to the first vSwitch and the second vSwitch respectively, so that the first vSwitch and the second vSwitch forward a packet between the first VM and the second VM according to the first configuration information and the second configuration information respectively.

2. The method according to claim 1, wherein, said distributing the first configuration information and the second configuration information in the topology management information to the first vSwitch and the second vSwitch respectively comprising:
    distributing, by the SDN controller, the topology management information to the first hypervisor manager, so that the first hypervisor manager distributes the first configuration information in the topology management information to the first vSwitch; and
    distributing, by the SDN controller, the topology management information to the second hypervisor manager, so that the second hypervisor manager distributes the second configuration information in the topology management information to the second vSwitch.

3. The method according to claim 1, further comprising:
    receiving, by the SDN controller, a vSwitch-going-online message sent by a third vSwitch which is becoming online in the first hypervisor manager; and
    creating, by the SDN controller, a record for the third vSwitch in the first domain corresponding to the first hypervisor manager according to the vSwitch-going-online message.

4. The method according to claim 1, further comprising:
    receiving, by the SDN controller, a VM-going-online message sent by a vSwitch corresponding to a third VM which is becoming online in the first hypervisor manager; and
    adding, by the SDN controller, a record for the third VM into the topology management information according to the VM-going-online message.

5. The method according to claim 1, further comprising:
    determining, by the SDN controller, whether the first VM and the second VM are allowed to intercommunicate or not according to the first virtual network topology information and the second virtual network topology information in a case the SDN controller receives a packet from the first vSwitch, wherein a source virtual device of the packet being the first VM and a target virtual device of the packet being the second VM;
    creating, by the SDN controller, a first flow table when the first VM and the second VM are allowed to intercommunicate;

distributing, by the SDN controller, the first flow table to the first vSwitch so that the first vSwitch sends the packet to the second vSwitch according to the first flow table;

creating, by the SDN controller, a second flow table when the SDN controller receives the packet from the second vSwitch; and distributing the second flow table to the second vSwitch so that the second vSwitch sends the packet to the second VM according to the second flow table.

6. The method according to claim 5, wherein said determining whether the first VM and the second VM are allowed to intercommunicate or not comprises:

determining, by the SDN controller, whether the first VM and the second VM correspond to a same virtual router or not by looking up the first virtual network topology information and the second virtual network topology information; and determining, by the SDN controller, the first VM and the second VM are allowed to intercommunicate when the first VM and the second VM correspond to the same virtual router.

7. The method according to claim 5, wherein said creating a first flow table comprises:

acquiring, by the SDN controller, a virtual IP address and a going-online port corresponding to the second VM from the second virtual network topology information, wherein, the second VM becomes online in the second vSwitch through the going-online port;

acquiring, by the SDN controller, tunnel encapsulation information of the second vSwitch corresponding to the second VM from the second configuration information; and creating, by the SDN controller, the first flow table comprising the virtual IP address and the going-online port of the second VM and the tunnel encapsulation information.

8. The method according to claim 7, wherein said creating a second flow table comprises:

creating, by the SDN controller, the second flow table comprising the virtual IP address and the going-online port of the second VM.

9. An apparatus for managing a virtual network, comprising: a processor, and a non-transitory storage medium storing machine-executable instructions corresponding to a virtual network management logic, wherein by executing the machine-executable instructions, the processor is caused to:

create a first domain and a second domain respectively for a first hypervisor manager and a second hypervisor manager in a virtual network, wherein the first hypervisor manager and the second hypervisor manager are heterogeneous, the first hypervisor manager manages a first virtual machine (VM) and a first virtual switch (vSwitch), and the second hypervisor manager manages a second VM and a second vSwitch;

create topology management information based on a topology of the virtual network, wherein the topology management information comprises first virtual network topology information for the first domain, second virtual network topology information for the second domain, first configuration information for the first vSwitch and second configuration information for the second vSwitch;

associate the topology management information with the first domain and the second domain respectively; and distribute the first configuration information and the second configuration information in the topology management information to the first vSwitch and the second vSwitch respectively, so that the first vSwitch and the second vSwitch forward a packet between the first VM and the second VM according to the first configuration information and the second configuration information respectively.

10. The apparatus according to claim 9, wherein the machine-executable instructions further cause the processor to:

receive a vSwitch-going-online message sent by a third vSwitch which is becoming online in the first hypervisor manager; and create a record for the third vSwitch in the first domain corresponding to the first hypervisor manager according to the vSwitch-going-online message.

11. The apparatus according to claim 9, wherein the machine-executable instructions further cause the processor to:

receive a VM-going-online message sent by a vSwitch corresponding to a third VM which is becoming online in the first hypervisor manager; and add a record for the third VM into the topology management information according to the VM-going-online message.

12. The apparatus according to claim 9, the machine-executable instructions further cause the processor to:

determine whether the first VM and the second VM are allowed to intercommunicate or not according to the first virtual network topology information and the second virtual network topology information in a case that a packet is received from the first vSwitch, wherein a source virtual device of the packet being the first VM and a target virtual device of the packet being the second VM;

create a first flow table when the first VM and the second VM are allowed to intercommunicate;

distribute the first flow table to the first vSwitch so that the first vSwitch sends the packet to the second vSwitch according to the first flow table;

create a second flow table when the packet is received from the second vSwitch; and distribute the second flow table to the second vSwitch so that the second vSwitch sends the packet to the second VM according to the second flow table.

13. The apparatus according to claim 12, wherein the machine-executable instructions further cause the processor to:

determine whether the first VM and the second VM correspond to a same virtual router or not by looking up the first virtual network topology information and the second virtual network topology information; and determine the first VM and the second VM are allowed to intercommunicate when the first VM and the second VM correspond to the same virtual router.

14. The apparatus according to claim 12, wherein the machine-executable instructions further cause the processor to:

acquire a virtual IP address and a going-online port corresponding to the second VM from the second virtual network topology information, wherein, the second VM becomes online in the second vSwitch through the going-online port;

acquire tunnel encapsulation information of the second vSwitch corresponding to the second VM from the second configuration information; and create the first flow table comprising the virtual IP address and the going-online port of the second VM and the tunnel encapsulation information.

15. The apparatus according to claim 14, wherein the machine-executable instructions further cause the processor to:

create the second flow table comprising the virtual IP address and the going-online port of the second VM.

* * * * *